United States Patent
Otsuka

(10) Patent No.: US 12,034,786 B2
(45) Date of Patent: Jul. 9, 2024

(54) IMAGE PROCESSING DEVICE, IMAGE DATA TRANSFER DEVICE, AND IMAGE GENERATION METHOD

(71) Applicant: Sony Interactive Entertainment Inc., Tokyo (JP)

(72) Inventor: Katsushi Otsuka, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 163 days.

(21) Appl. No.: 17/909,481

(22) PCT Filed: Mar. 30, 2020

(86) PCT No.: PCT/JP2020/014495
§ 371 (c)(1),
(2) Date: Sep. 6, 2022

(87) PCT Pub. No.: WO2021/199128
PCT Pub. Date: Oct. 7, 2021

(65) Prior Publication Data
US 2023/0132071 A1  Apr. 27, 2023

(51) Int. Cl.
*H04L 65/60* (2022.01)
*G06T 3/40* (2024.01)
(Continued)

(52) U.S. Cl.
CPC .............. *H04L 65/60* (2013.01); *G06T 3/40* (2013.01); *G06T 11/00* (2013.01); *A63F 13/358* (2014.09); *A63F 13/52* (2014.09); *G06T 2200/24* (2013.01)

(58) Field of Classification Search
CPC ..... H04L 65/60; H04L 65/75; H04L 65/1069; H04L 65/80; G06T 3/40; G06T 11/00;
(Continued)

(56) References Cited

U.S. PATENT DOCUMENTS 8,105,167 B2   1/2012   Mori
10,098,080 B2  10/2018  Amano
(Continued)

FOREIGN PATENT DOCUMENTS

JP   5324799 A     12/1993
JP   2002125203 A   4/2002
(Continued)

OTHER PUBLICATIONS

Decision to Grant a Patent for corresponding JP Application No. 2022512522, 5 pages, dated Jan. 31, 2024.
(Continued)

*Primary Examiner* — Vijay Shankar
(74) *Attorney, Agent, or Firm* — Matthew B. Dernier, Esq.

(57) ABSTRACT

In a server, a client information acquiring section acquires information related to a user operation from an image processing device. An operation status identifying section of an image generating section identifies the contents displayed on the image processing device side at the time when the user operation is performed. A drawing section generates a frame corresponding to the details of the user operation and the contents displayed at the time when the user operation is performed. A discard processing section determines whether or not to discard the data, on the basis of the contents of a provisional frame generated before the detection of the user operation.

18 Claims, 10 Drawing Sheets

(51) Int. Cl.
*G06T 11/00* (2006.01)
*A63F 13/358* (2014.01)
*A63F 13/52* (2014.01)

(58) Field of Classification Search
CPC .... G06T 2200/24; A63F 13/358; A63F 13/52; G06F 3/01; H04N 21/44
See application file for complete search history.

(56) References Cited

U.S. PATENT DOCUMENTS

| | | | |
|---|---|---|---|
| 10,871,822 | B2 | 12/2020 | Nakata |
| 11,640,203 | B2 * | 5/2023 | Yoshiike ................ B25J 9/1689 345/156 |
| 2009/0149260 | A1 | 6/2009 | Mori |
| 2015/0161756 | A1 | 6/2015 | Bono |
| 2015/0327192 | A1 | 11/2015 | Amano |
| 2019/0317595 | A1 | 10/2019 | Nakata |
| 2022/0391014 | A1 * | 12/2022 | Yoshiike ............. H04B 17/104 |
| 2023/0099405 | A1 * | 3/2023 | Otsuka ................... G06F 3/013 382/232 |
| 2023/0240628 | A1 * | 8/2023 | Cohen ...................... G06T 7/73 382/128 |
| 2023/0336862 | A1 * | 10/2023 | Uekusa .................. G06F 3/013 |

FOREIGN PATENT DOCUMENTS

| | | |
|---|---|---|
| JP | 2007160015 A | 6/2007 |
| JP | 2012033038 A | 2/2012 |
| JP | 2013206188 A | 10/2013 |
| JP | 2014120830 A | 6/2014 |
| JP | 5635672 B1 | 6/2015 |
| JP | 2015202125 A | 11/2015 |
| JP | 2015212920 A | 11/2015 |
| JP | 2017228044 A | 12/2017 |
| WO | 2017221784 A1 | 12/2017 |

OTHER PUBLICATIONS

International Search Report for corresponding PCT Application No. PCT/JP2020/014495, 6 pages, dated Sep. 1, 2020.

* cited by examiner

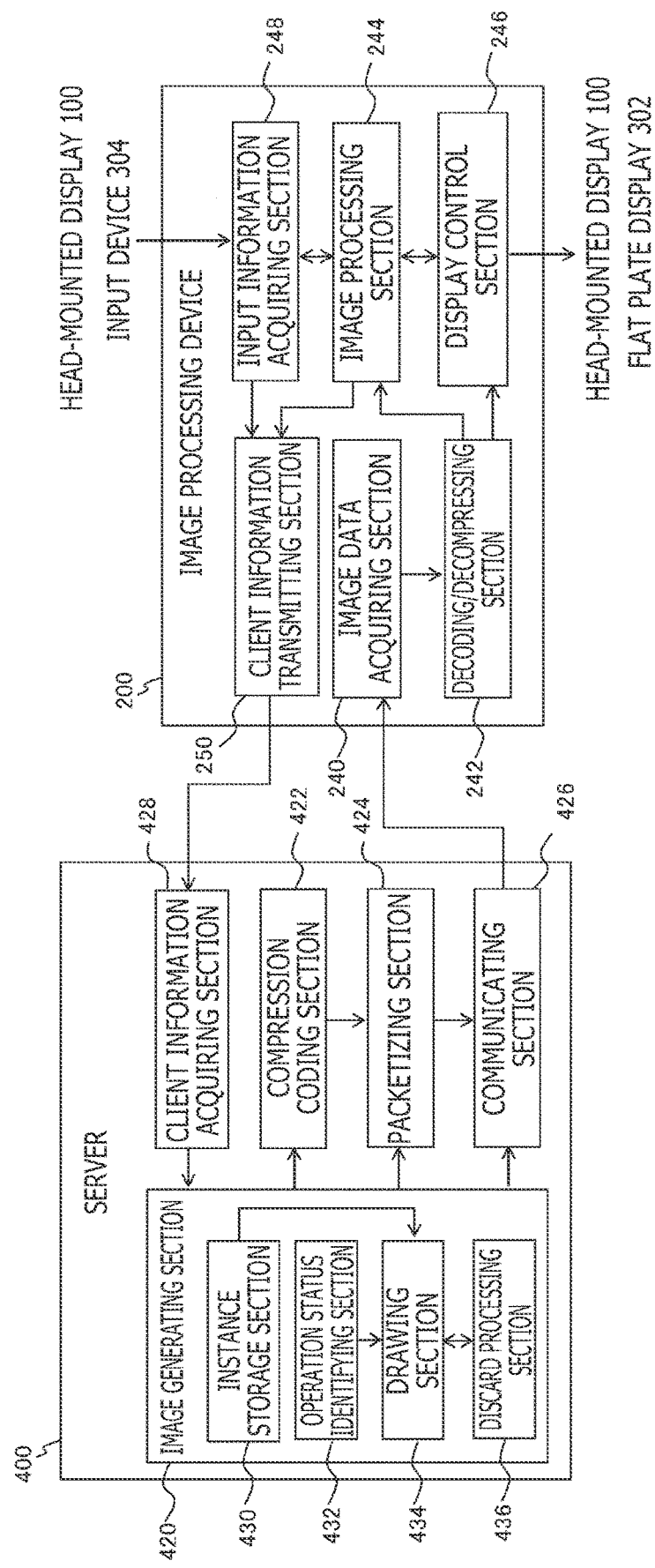
F I G . 6

IMAGE PROCESSING DEVICE, IMAGE DATA TRANSFER DEVICE, AND IMAGE GENERATION METHOD

TECHNICAL FIELD

The present invention relates to an image data transfer device and an image generation method for processing data of a moving image to be displayed.

BACKGROUND ART

With the recent improvements in information processing technology and image display technology, it has become possible for users to experience a visual world in various forms. For example, by displaying a panoramic image on a head-mounted display and displaying an image corresponding to a user's line of sight, a sense of immersion in the visual world can be enhanced, or the operability of applications such as games can be improved. Further, by displaying image data streamed from a server having abundant resources, a user can enjoy high-definition moving images or game screens regardless of the location and scale.

SUMMARY

Technical Problem

In a technique of immediately displaying image data transmitted via the network on a client terminal, a delay time in the communication between the client terminal and a server can be a problem. For example, in the case where a user operation performed on the client terminal side is to be reflected in a display image, transmission and reception of data is necessary such as transmission of the user operation to the server and transmission of image data from the server to the client terminal, which may create a delay time that cannot be overlooked. This problem is more likely to become apparent as a higher image quality is pursued.

The present invention has been made in view of the problem, and an object thereof is to provide a technique for improving the responsiveness of a display to a user operation in an image display accompanied by data transmission by communication.

Solution to Problem

In order to solve the above problem, one aspect of the present invention relates to an image data transfer device. The image data transfer device includes a client information acquiring section that acquires information related to a user operation performed on a client terminal, an image generating section that generates a frame of a moving image according to the user operation, and a communicating section that performs streaming transfer of data of the generated frame to the client terminal. The image generating section identifies contents displayed at the time when the user operation is performed, and causes contents represented by the frame to correspond to the user operation and the contents displayed at the time when the user operation is performed.

Another aspect of the present invention relates to an image generation method. The image generation method performed by an image data transfer device includes a step of acquiring information related to a user operation performed on a client terminal, a step of generating a frame of a moving image according to the user operation, and a step of performing streaming transfer of data of the generated frame to the client terminal. The step of generating the frame includes identifying contents displayed at the time when the user operation is performed, and causing contents represented by the frame to correspond to the user operation and the contents displayed at the time when the user operation is performed.

It should be noted that any combination of the above components and matters of converted representation of the present invention between methods, devices, systems, computer programs, data structures, recording media, and the like are also effective as aspects of the present invention.

Advantageous Effect of Invention

According to the present invention, the responsiveness of the display to a user operation can be improved in an image display accompanied by data transmission by communication.

BRIEF DESCRIPTION OF DRAWINGS

FIG. 6 is a diagram illustrating functional blocks of the server and the image processing device of the present embodiment.

DESCRIPTION OF EMBODIMENT

Figure 1:
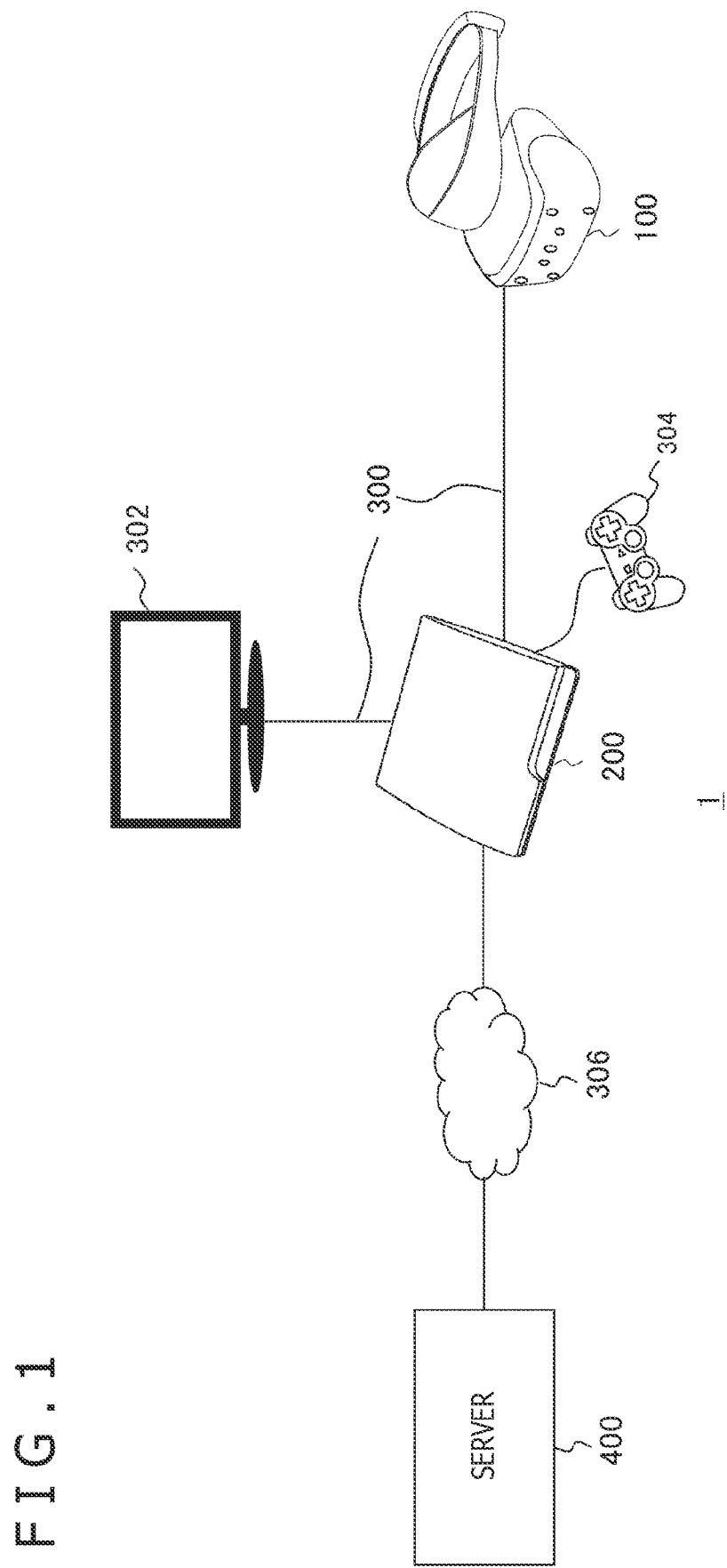
FIG. 1 is a diagram illustrating a configuration example of an image processing system according to the present embodiment.

FIG. 1 illustrates a configuration example of an image processing system according to the present embodiment. An image display system 1 includes an image processing device 200, a head-mounted display 100, a flat plate display 302, and a server 400. The image processing device 200 is connected to the head-mounted display 100 and the flat plate display 302 by an interface 300 such as wireless communication, a USB (Universal Serial Bus) Type-C, or an HDMI (High-definition Multimedia Interface) (registered trademark). The image processing device 200 is further connected to the server 400 via a network 306 such as the Internet or a LAN (Local Area Network).

As an image data transfer device, the server 400 generates at least a part of an image to be displayed and transmits the generated one to the image processing device 200. Here, the server 400 may be a server of a company or the like that provides various distribution services such as a cloud game, or may be a home server or the like that transmits data to any terminal. Therefore, the network 306 is not limited in scale, and may be a public network such as the Internet or may be a LAN or the like. For example, the network 306 may be a mobile phone carrier network or may be a network via a Wi-Fi spot in the city or a Wi-Fi access point at home. Alternatively, the image processing device 200 and the server 400 may directly be connected to each other by a video interface.

The image processing device 200 performs necessary processing on the image data transmitted from the server 400 and outputs the data to at least either the head-mounted display 100 or the flat plate display 302. For example, the server 400 receives the movements of the heads of a plurality of users who wear the respective head-mounted displays 100 and operations performed by the users, from the image processing devices 200 connected to corresponding ones of the head-mounted displays 100.

Here, an input device 304 may be connected to the image processing device 200. The input device 304 functions as means for receiving an operation performed by a user on a game to be executed or the like. However, the means for receiving a user operation is not limited to this, and the image processing device 200 may acquire the movement and voice of the user via a camera, a motion sensor, a microphone, or the like (not illustrated) and accept these as user operations. The image processing device 200 may detect the movement of the head of the user wearing the head-mounted display 100, as a user operation which is made through a gesture. In any case, the image processing device 200 sequentially transmits the details of the user operation to the server 400.

Meanwhile, for example, the server 400 draws, in a field of view corresponding to the movement of the head of each user, a virtual world changed according to a user operation and then transmits the drawing to each image processing device 200. The image processing device 200 converts the transmitted image data into a format suitable for the head-mounted display 100 or the flat plate display 302, as necessary, and then outputs the converted image data to the head-mounted display 100 or the flat plate display 302 at an appropriate timing. By repeating such processing for each frame of the moving image, a cloud gaming system in which a plurality of users participate can be achieved.

At this time, after combining the image transmitted from the server 400 with a separately prepared UI (User Interface) plain image (also referred to as an OSD (On Screen Display) plain image) or an image captured by a camera included in the head-mounted display 100, the image processing device 200 may output the combined image to the head-mounted display 100 or the flat plate display 302.

The image processing device 200 may also improve the conformability of the display to the movement of the head by correcting the image transmitted from the server 400 on the basis of the position and orientation of the head-mounted display 100 immediately before the image is displayed. The image processing device 200 may cause the flat plate display 302 to display an image in a similar visual field so as to also allow another person to see what kind of image the user wearing the head-mounted display 100 is viewing.

However, the contents of the moving image to be displayed in the present embodiment and the display destination thereof are not limited to particular ones. For example, the server 400 may use an image captured by a camera (not illustrated) as a display target and execute a live stream of the image to the image processing device 200. At this time, the server 400 may acquire multi-view images captured by a plurality of cameras at an event venue for a sports competition, a concert, or the like, and use the images to create an image in a field of view corresponding to the movement of the head-mounted display 100, to thereby generate a live image of a free viewpoint and to distribute the image to each image processing device 200.

Further, the configuration of the system to which the present embodiment can be applied is not limited to the one illustrated in the figure. For example, the display device connected to the image processing device 200 may be either the head-mounted display 100 or the flat plate display 302, or may be a plurality of head-mounted displays 100. Further, the image processing device 200 may be built in the head-mounted display 100 or the flat plate display 302. For example, a personal computer or a mobile terminal (portable game machine, high-performance mobile phone, tablet terminal) integrally equipped with a flat plate display, an image processing device, and an input device may be used.

At least either the head-mounted display 100 or the flat plate display 302 may be able to be further connected to these devices, as necessary. Further, the number of image processing devices 200 connected to the server 400 is not limited to a particular number. Still further, the server 400 may receive the details of operations performed by a plurality of users who are viewing contents displayed on their own flat plate displays 302, from the image processing devices 200 connected to respective flat plate displays 302, generate images corresponding to the operations, and then transmit the images to the respective image processing devices 200.

Figure 2:
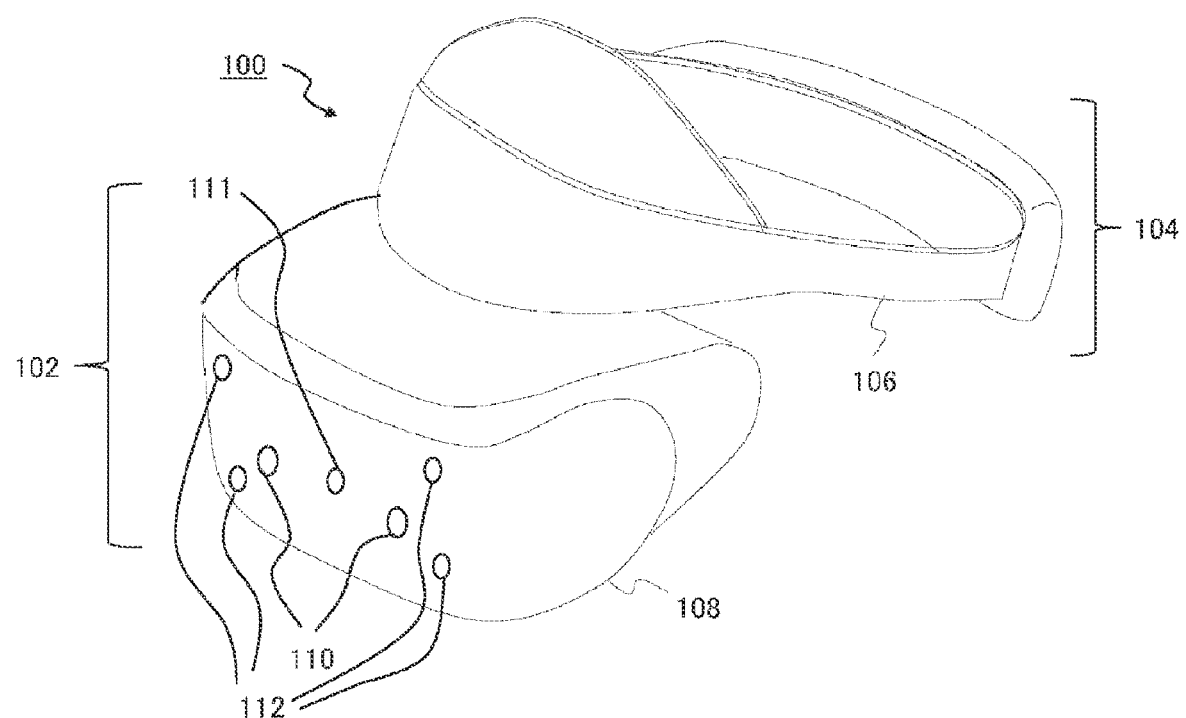
FIG. 2 is a diagram illustrating an example of the appearance of a head-mounted display of the present embodiment.

FIG. 2 illustrates an example of the appearance of the head-mounted display 100. In this example, the head-mounted display 100 includes an output mechanism unit 102 and a mounting mechanism unit 104. The mounting mechanism unit 104 includes a mounting band 106 that winds around the head of the user and that ensures fixing of the device when the user wears the device. The output mechanism unit 102 includes a housing 108 having a shape that covers the right and left eyes when the head-mounted display 100 is worn on the user, and includes a display panel arranged inside to face the eyes at the time of wearing.

Further, the inside of the housing 108 is provided with eyepieces that are located between the display panel and the user's eyes when the head-mounted display 100 is mounted, and that allows magnified images to be seen. Further, the head-mounted display 100 may further include speakers or earphones at positions corresponding to the user's ears when the display is worn.

The head-mounted display 100 further includes a stereo camera 110 on a front surface of the housing 108, a monocular camera 111 with a wide viewing angle in the center, and four cameras 112 with a wide viewing angle at the four corners of the upper left, upper right, lower left, and lower right, and takes a video of the real space in the direction corresponding to the orientation of the user's face. In a certain mode, the head-mounted display 100 provides a see-through mode allowing the user to see the state of the real space as it is located in the direction in which the user is facing, by immediately displaying a moving image captured by the stereo camera 110.

Further, at least any one of the images captured by the stereo camera 110, the monocular camera 111, and the four cameras 112 may be used to generate the display image. For example, SLAM (Simultaneous Localization and Mapping) may be used to acquire the position and orientation of the head-mounted display 100, namely, the position and orientation of the user's head, with respect to the surrounding space at a predetermined rate, to determine the field of view of the image generated by the server 400 and to correct the image in the image processing device 200. Alternatively, the image processing device 200 may combine the captured image with the image transmitted from the server 400, to form a display image.

Further, the head-mounted display 100 may be provided with any of motion sensors for deriving the position, orientation, and movement of the head-mounted display 100, such as an acceleration sensor, a gyro sensor, and a geomagnetic sensor. In this case, the image processing device 200 acquires information regarding the position and orientation of the user's head at a predetermined rate on the basis of the measured values of the motion sensor. This information can be used to determine the field of view of the image generated by the server 400 and to correct the image in the image processing device 200.

Figure 3:
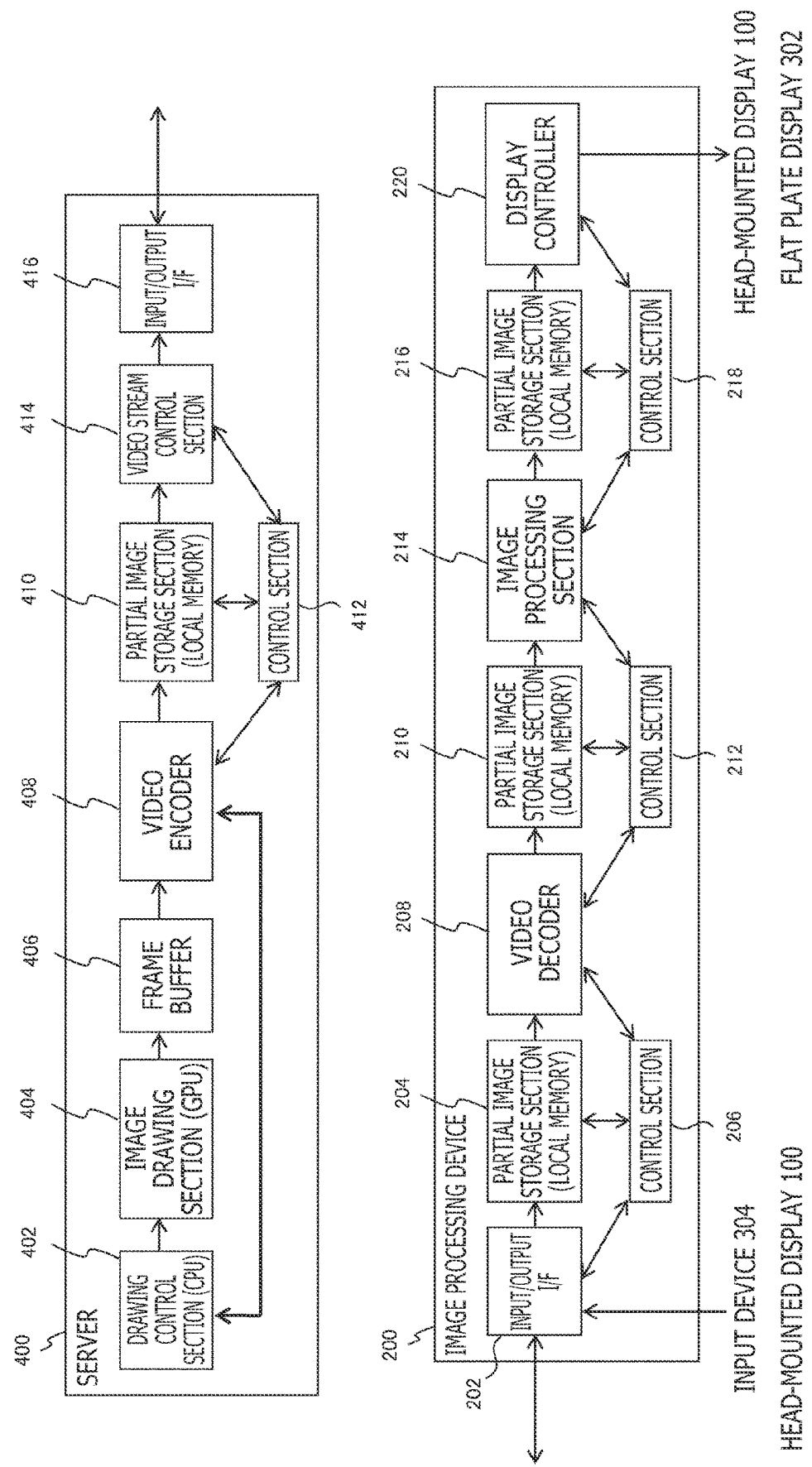
FIG. 3 is a diagram illustrating a basic configuration of a server and an image processing device according to the present embodiment.

FIG. 3 illustrates the basic configuration of the server 400 and the image processing device 200 in the present embodiment. The server 400 and the image processing device 200 in the present embodiment are provided with local memories each for storing a partial image smaller than one frame of the display image, at key points. Then, compression coding and transmission of image data in the server 400, and reception of data, decoding/decompression, various types of image processing, and output to the display device in the image processing device 200 are subjected to pipeline processing for each partial image. This reduces the delay time which is produced between the drawing of the image in the server 400 and the display on the display device connected to the image processing device 200.

In the server 400, a drawing control section 402 is constituted by a CPU (Central Processing Unit) and controls drawing of an image in an image drawing section 404. Although the contents of the image to be displayed are not limited to particular ones in the present embodiment as described above, the drawing control section 402 causes the image drawing section 404 to draw a frame of a moving image representing the result of the progress of the cloud game, for example. At this time, the drawing control section 402 may acquire information related to the position and orientation of the user's head from the image processing device 200 and control the drawing of each frame according to the corresponding visual field.

The image drawing section 404 is constituted by a GPU (Graphics Processing Unit), draws a frame of a moving image at a predetermined or variable rate under the control of the drawing control section 402, and stores the result in a frame buffer 406. The frame buffer 406 is constituted by RAM (Random Access Memory). Under the control of the drawing control section 402, a video encoder 408 compresses and encodes the image data stored in the frame buffer 406, for each partial image smaller than one frame. The partial image is an image of each of regions formed by dividing the image plane of the frame by boundary lines set in the horizontal direction, the vertical direction, both the vertical and horizontal directions, or the diagonal direction, for example.

At this time, the video encoder 408 may start the compression coding of the frame as soon as the image required for the compression coding is drawn by the image drawing section 404, without waiting for a vertical synchronization signal of the server. According to the conventional technique of synchronizing various types of processing such as frame drawing and compression coding with the vertical synchronization signal, the time given to each piece of processing from the image drawing to the display is made uniform for each frame, making managing the frame order easy. However, in this case, even if the drawing processing ends early depending on the contents of the frame, it is necessary to wait for the next vertical synchronization signal to perform the compression coding processing. In the present embodiment, as will be described later, unnecessary waiting time is prevented from occurring by managing the generation time for each partial image.

The coding method used by the video encoder 408 for compression coding may be one commonly used, such as H.264/AVC (Advanced Video Coding) or H.265/HEVC (High Efficiency Video Coding). The video encoder 408 stores the compressed and encoded image data in a partial image storage section 410. The partial image storage section 410 is a local memory constituted by an SRAM (Static Random Access Memory) or the like, and has a storage area corresponding to the data size of a partial image smaller than one frame. A similar configuration is applied to the "partial image storage section" described below. A video stream control section 414 reads out the compressed and encoded partial image data each time the image data is stored in the partial image storage section 410, causes the data to include audio data, control information, and the like as necessary, and then packetizes the data.

A control section 412 constantly monitors the data writing status of the video encoder 408 to the partial image storage section 410, the data reading status of the video stream control section 414 from the partial image storage section 410, and the like, and appropriately controls the operations of both the video encoder 408 and the video stream control section 414. For example, the control section 412 performs control such that data shortage, namely, buffer underrun, or data overflow, namely, buffer overrun, does not occur in the partial image storage section 410.

An input/output interface 416 establishes communication with the image processing device 200 and sequentially transmits, via the network 306, the data packetized by the video stream control section 414. The input/output interface 416 may appropriately transmit audio data, data for tactile feedback, and the like, in addition to image data. Further, the input/output interface 416 may acquire information related to user operations and the position and orientation of the user's head, information related to various types of time to be described later, various notification signals, etc., from the image processing device 200 and supply the information to the drawing control section 402 and the like.

In the image processing device 200, an input/output interface 202 sequentially acquires data of image and audio, data for tactile feedback, various notification signals, and the like transmitted from the server 400. Further, the input/output interface 202 appropriately acquires information related to the user operation and the position and orientation of the user's head or other information from the input device 304, the head-mounted display 100, or the like, and transmits the information to the server 400. The input/output interface 202 may also transmit, to the server 400, information related to various types of time inside the image processing device 200 and various notification signals.

Then, the input/output interface 202 decodes packets acquired from the server 400 and stores the extracted data of the image in a partial image storage section 204. The partial image storage section 204 is a local memory provided between the input/output interface 202 and a video decoder 208. A control section 206 constantly monitors the data writing status of the input/output interface 202 to the partial image storage section 204, the data reading status of the video decoder 208 from the partial image storage section 204, and the like, and appropriately controls the operations of both the input/output interface 202 and the video decoder 208.

Each time the partial image data is stored in the partial image storage section 204, the video decoder 208 reads out the data, decodes and decompresses the data according to the procedure corresponding to the coding method, and sequentially stores the data in a partial image storage section 210. The partial image storage section 210 is a local memory provided between the video decoder 208 and an image processing section 214. A control section 212 constantly monitors the data writing status of the video decoder 208 to the partial image storage section 210, the data reading status of the image processing section 214 from the partial image storage section 210, and the like, and appropriately controls the operations of both the video decoder 208 and the image processing section 214.

The image processing section 214 reads out the decoded and decompressed partial image data each time the data is stored in the partial image storage section 210, and performs processing necessary for display. For example, in order to allow a user to visually recognize an image without distortion when the user views the image through the eyepiece of the head-mounted display 100, a correction processing of giving distortion opposite to the distortion caused by the eyepiece is performed.

Alternatively, the image processing section 214 may refer to a separately prepared UI plane image and combine (superimpose) the image with an image transmitted from the server 400. Further, the image processing section 214 may combine the image captured by the camera included in the head-mounted display 100, with the image transmitted from the server 400. The image processing section 214 may also correct the image transmitted from the server 400 such that the field of view corresponds to the position and orientation of the user's head at the time of processing. The image processing section 214 may also perform image processing such as super-resolution processing suitable for output to the flat plate display 302.

In any case, the image processing section 214 executes processing in units of partial images stored in the partial image storage section 210, and sequentially stores the partial images in a partial image storage section 216. The partial image storage section 216 is a local memory provided between the image processing section 214 and a display controller 220. A control section 218 constantly monitors the data writing status of the image processing section 214 to the partial image storage section 216, the data reading status of the display controller 220 from the partial image storage section 216, and the like, and appropriately controls the operations of both the image processing section 214 and the display controller 220.

Each time the partial image data that has undergone the image processing is stored in the partial image storage section 216, the display controller 220 reads out the data and outputs the data to the head-mounted display 100 or the flat plate display 302 at an appropriate timing. To be specific, the data of the uppermost partial image of each frame is output at the timing corresponding to the vertical synchronization signal of those displays, and then, the data of the lower partial images is sequentially output in descending order.

Figure 4:
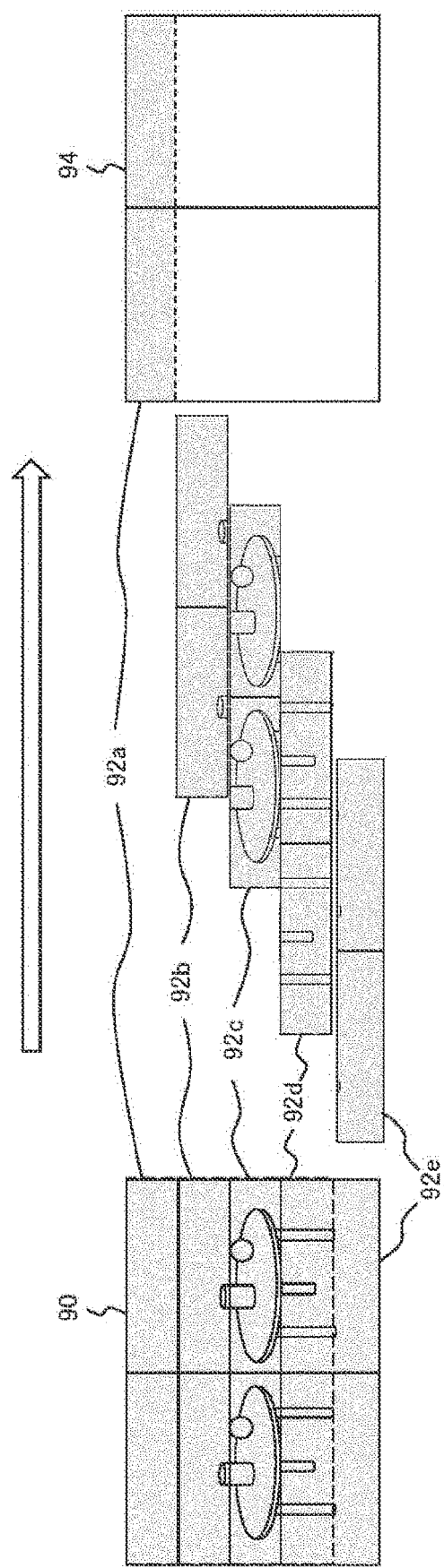
FIG. 4 is a diagram conceptually illustrating a manner in which processing from drawing of an image to display of the image is performed in the present embodiment.

Next, the pipeline processing of a partial image which is implemented by the server 400 and the image processing device 200 between drawing of the image and display of the image will be described. FIG. 4 conceptually illustrates a manner in which processing from drawing of an image to display of the image is performed in the present embodiment. As described above, the server 400 generates a frame 90 of a moving image at a predetermined or variable rate. In the illustrated example, the frame 90 has an image for the left eye and an image for the right eye which are arranged in respective regions obtained by equally dividing the frame into two parts on the right and left, but the image generated by the server 400 is not intended to be limited to this.

As described above, the server 400 compresses and encodes the frame 90 for each partial image. In the figure, the image plane is divided into five in the horizontal direction to form partial images 92a, 92b, 92c, 92d, and 92e. Accordingly, the partial images are compressed and encoded one after another in this order, and are transmitted to the image processing device 200 to be displayed, as indicated by an arrow. That is, while the uppermost partial image 92a is subjected to processing such as compression coding, transmission, decoding/decompression, and output to a display panel 94, the lower partial image 92b and the further lower partial image 92c are sequentially transmitted and displayed. As a result, various types of processing required for the drawing of images up to the display of the images can be performed in parallel, and display can be advanced with a minimum delay even if transfer time is involved.

Meanwhile, in a cloud game or the like, a procedure is required in which the user first recognizes game contents such as video, audio, and tactile feedback transferred from the server 400, performs some operation as a reaction to the game contents, and then sends the details of the operation to the server 400 in return. That is, at the time when the frame transmitted from the server 400 is displayed on the image processing device 200 side, the server 400 is processing a next frame, and when the server 400 receives the operation performed by the user on the displayed frame, the server 400 is processing a further subsequent frame.

Figure 5:
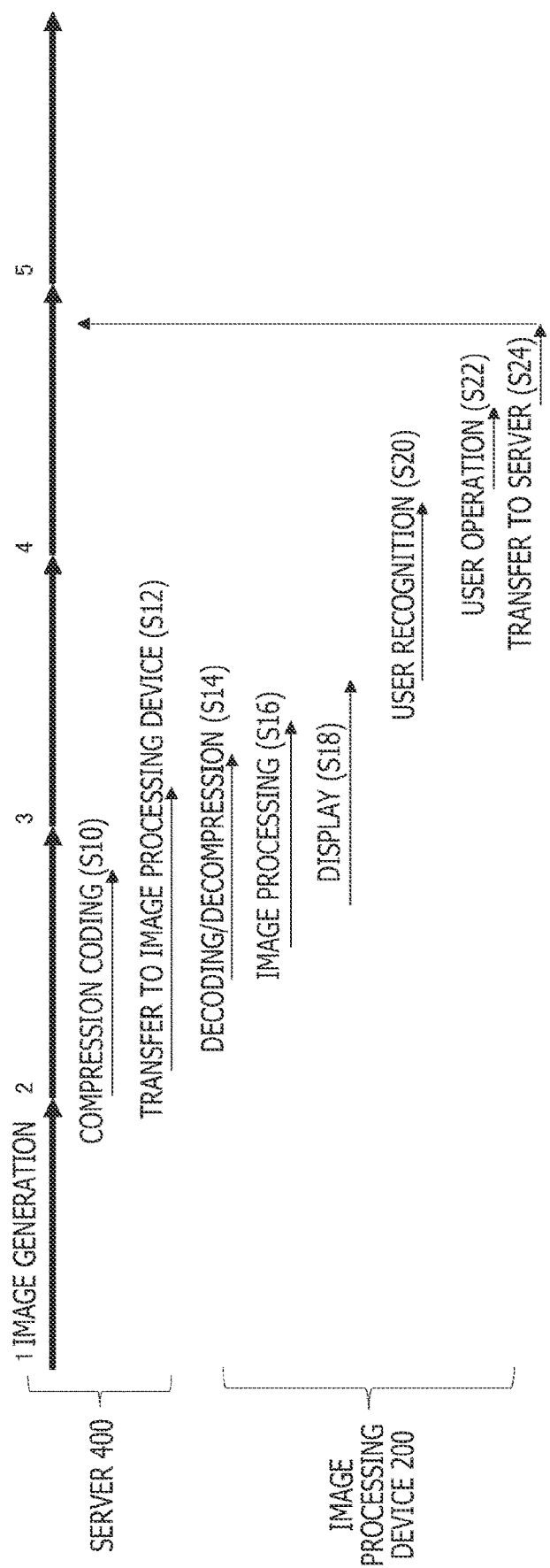
FIG. 5 is a diagram illustrating a flow of frame processing in the server and the image processing device of the present embodiment.

Here, when the server 400 detects the user operation, if the detected user operation is reflected as it is in the moving image being generated, the user recognizes that the operation performed by him- or herself is put into action with a time lag. As a result, a situation unintended by the user may occur, and in some cases, the image world may collapse. FIG. 5 illustrates a flow of frame processing in the server 400 and the image processing device 200. In the figure, the time elapses in the horizontal direction, and the top row illustrates the generation time of each frame of the moving image in the server 400 by a thick arrow together with the frame number. Further, the time of various types of processing performed for the "1st" frame are listed below.

After generating the "1st" frame, the server 400 compresses and encodes the data (S10) and transfers the data to the image processing device 200 (S12). When receiving the data, the image processing device 200 decodes and decompresses the data (S14), performs necessary image processing (S16), and causes the display device to display the data (S18). As described above, the processes of S10 to S18 can be performed in parallel in a state of overlapping in time, by advancing in units of partial images.

The user recognizes the image displayed in this way (S20) and makes an operation (S22). Then, the image processing device 200 receives the operation and transfers the information related to the details of the operation to the server 400 (S24). With this, the server 400 identifies the details of the user operation during the generation of the "4th" frame in the illustrated example. As a result, the "2nd" to "4th" frames displayed after the user performs the operation in the image processing device 200 represent an image world on the premise that the user operation has not been performed.

As described above, if the user operation is reflected as it is in the moving image at the time when the server 400 detects it, such reflection causes a state as if the user operation were performed on the "5th" frame. In the case where the game is played in a local environment, such a delay time is unlikely to occur, so that poor responsiveness due to communication with the outside is likely to become apparent.

Therefore, the server 400 in the present embodiment identifies the image world displayed at the time when the user operation is performed, and generates the latest frame in response to the user operation being performed at that time. In the illustrated example, an image world tentatively created from the "2nd" frame is retroactively corrected, and then, the "5th" and subsequent frames are generated. With this, even if the operation is performed via communication, the influence on the image world and the situation of the game can be minimized. Incidentally, as described above, the pipeline processing performed for each partial image in the server 400 and the image processing device 200 is effective in reducing the delay, but the present embodiment is not intended to be limited to that. That is, the reflection processing of the user operation to be described below exerts a similar effect even in the case where the processing is progressed frame by frame.

FIG. 6 illustrates functional blocks of the server 400 and the image processing device 200 of the present embodiment. Each functional block illustrated in the figure can be achieved in terms of hardware by a CPU, a GPU, an encoder, a decoder, a computing unit, various memories, etc., and achieved in terms of software by a program that exerts various functions such as an information processing function, an image drawing function, a data input/output function, and a communication function which are loaded from a recording medium into a memory. Therefore, it is understood by those skilled in the art that these functional blocks can be achieved in various forms by hardware only, software only, or a combination thereof, and the present invention is not limited to any of these.

The server 400 includes an image generating section 420, a compression coding section 422, a packetizing section 424, a communicating section 426, and a client information acquiring section 428. The image generating section 420 includes the drawing control section 402, the image drawing section 404, and the frame buffer 406 in FIG. 3 and generates a frame of a moving image to be transmitted to the image processing device 200, such as a game image, at a predetermined or variable rate. Alternatively, the image generating section 420 may acquire moving image data from a camera, a storage device, or the like (not illustrated).

To be specific, the image generating section 420 includes an instance storage section 430, an operation status identifying section 432, a drawing section 434, and a discard processing section 436. The instance storage section 430 holds the past state (instance) of the world represented by the generated moving image, for a predetermined period of time. Here, the "state (instance)" is at least information that is necessary for drawing an image and that can change according to a user operation. For example, the position and posture of an object to be operated by a user, the position and posture of an enemy character, a battle situation, a story, the contents of a conversation, the state of surrounding objects, and the like are exemplified in an electronic game.

However, the instances are not intended to be limited to these and may vary depending on the contents to be expressed. In the example of FIG. 5, in order to accurately reflect the details of the user operation in the image world, the instance in the "1st" frame is required. Therefore, the instance storage section 430 stores instances for a predetermined number of frames. The operation status identifying section 432 identifies the contents displayed at the time when the user operation is performed in the image processing device 200. In the example of FIG. 5, it is identified that the display at the time when the user operation is performed is the "1st" frame.

The operation status identifying section 432 may identify not only the frame displayed at the time when the user operation is performed, but also the details of the processing applied to the frame in the image processing device 200. For example, as described above, in the case where the image processing device 200 corrects the visual field according to the position and orientation of the head-mounted display 100 immediately before the display, the operation status identifying section 432 identifies the displayed contents that have undergone the visual field correction. This makes it possible to accurately identify not only the timing of the user operation but also information regarding what the displayed image is like and which position the user operation has been applied to.

The drawing section 434 generates each frame of a moving image having a change corresponding to the user operation in the image processing device 200. To be specific, the drawing section 434 reflects the user operation in the past image world on the basis of the information identified by the operation status identifying section 432 together with the detection of the user operation, and then generates images indicating the subsequent changes. However, as will be described later, in consideration of the continuity with the displayed frame, the frame may continuously be generated assuming that the user operation has not been performed.

The discard processing section 436 performs the process of discarding the data of the undisplayed frame in the case where the past frame generated before the detection of the user operation on the premise that the user operation has not been performed has progressed in an irreversible direction or contradicts the image world generated on the premise that the user operation has been performed. In the example of FIG. 5, discontinuity may occur between the contents of the "5th" frame in which the user operation can be reflected and the contents of the preceding "2nd" to "4th" frames.

Hereinafter, past frames such as the "2nd" to "4th" frames which have been generated by the server 400 and in which the newly detected user operation is not reflected are referred to as "provisional frames." When the discontinuity between the provisional frames and the newly generated frame cannot be overlooked, such as a situation in which a destroyed object returns to its original state or an object suddenly appears in an empty space, the discard processing section 436 prevents the display of the provisional frames to the furthest possible extent, thereby making it difficult to recognize the discontinuity.

On the other hand, when the discontinuity is acceptable, that is, when the difference between the provisional frames and the newly generated frame is small, the provisional frames may be displayed as they are. Therefore, the discard processing section 436 determines whether or not to start the process for preventing the display of the provisional frames, by comparing the provisional frames with the new frame, for example. Thus, a determination criterion is set in advance inside the discard processing section 436. Qualitatively, as described above, it is determined to discard the provisional frame, when the frame has irreversible contents or when the contradiction between the provisional frames and the new frame is large.

In the case where it is determined to discard the frame, the discard processing section 436 transmits a signal for requesting the data discard of the transmitted frame to the image processing device 200 via the communicating section 426. The request signal is given a higher priority than the packet which transmits the frame data, and is transmitted to the image processing device 200, so that the image processing device 200 can receive the signal at a higher speed than the frame data. That is, the signal for requesting the data discard may be given high priority and transmitted ahead of other notifications and transfers that are in progress in parallel in the packetizing section 424, the communicating section 426, the input/output interfaces 416 and 202, a network, and an image data acquiring section 240, for example, which are functions related to data transmission/reception between the server 400 and the image processing device 200.

Then, the discard processing section 436 acquires the result of the data discard request from the image processing device 200. That is, the discard processing section 436 identifies whether or not the discard request signal is received by the image processing device 200 within the period of time in which the display can be prevented. In the case where the request signal is received within the period of time for preventing the display, the discard processing section 436 requests the compression coding section 422, packetizing section 424, and communicating section 426 to discard also the data of the provisional frame that has not been transmitted to the image processing device 200. As a result, transmission to the image processing device 200 is resumed from the data of the new frame in which the user operation has been reflected.

In the case where the discard request signal is not received within the period of time for preventing the display, the discard processing section 436 requests the drawing section 434 to generate the next frame assuming that the user operation has not been performed. That is, in the case where a provisional frame that is clearly inconsistent with the user operation has been displayed, the continuity of the image world is prioritized by matching the newly generated frame with the provisional frame.

The compression coding section 422 includes the video encoder 408, the partial image storage section 410, and the control section 412 in FIG. 3, and compresses and encodes the image data generated by the image generating section 420, in units of partial images. Here, the compression coding section 422 performs motion compensation and coding in units of areas having a predetermined number of rows such as one row or two rows, or rectangular areas having a predetermined size such as 16×16 pixels or 64×64 pixels. Therefore, the compression coding section 422 may start compression coding when the image generating section 420 generates data in the minimum unit area required for compression coding.

Incidentally, the partial image, which is a unit of pipeline processing in compression coding or transmission, may be the same as or larger than the minimum unit area. The packetizing section 424 includes the video stream control section 414 and the control section 412 in FIG. 3 and packetizes the compressed and encoded partial image data in a format corresponding to the communication protocol to be used. At this time, the time when the partial image is drawn (hereinafter referred to as "generation time") is acquired from the image generating section 420 or the compression coding section 422, and is associated with the data of the partial image.

The communicating section 426 includes the input/output interface 416 in FIG. 3 and transmits a packet including the compressed and encoded partial image data and the generation time thereof to the image processing device 200. With these configurations, the server 400 performs compression coding, packetization, and transmission in parallel by performing pipeline processing for each partial image smaller than one frame. The communicating section 426 also transmits the data discard request signal of the provisional frame to the image processing device 200 with high priority in response to the request from the discard processing section 436.

The client information acquiring section 428 includes the input/output interface 416 in FIG. 3 and acquires information related to user operations in the image processing device 200. That is, the client information acquiring section 428 acquires, together with the details of the user operation, temporal information for identifying the contents displayed at the time when the user operation is made on the image processing device 200. Specific examples will be described later. When the discard processing section 436 transmits a request signal for data discard of the provisional frame to the image processing device 200, the client information acquiring section 428 also acquires the result from the image processing device 200.

The client information acquiring section 428 may further acquire information relating to the details of image processing performed on each frame in the image processing device 200. For example, as described above, in the case where the image processing device 200 corrects the field of view of the display image on the basis of the position and orientation of the head-mounted display 100 immediately before the display, the client information acquiring section 428 may acquire the information related to the corrected field of view. The client information acquiring section 428 appropriately supplies the acquired information to the operation status identifying section 432 and the discard processing section 436.

The image processing device 200 includes an input information acquiring section 248, the image data acquiring section 240, a decoding/decompressing section 242, an image processing section 244, a display control section 246, and a client information transmitting section 250. The input information acquiring section 248 includes the input/output interface 202 in FIG. 3 and acquires the details of the user operation performed via the input device 304. At that time, the input information acquiring section 248 records the time when the user operation is performed.

The input information acquiring section 248 may further identify the position and orientation of the head-mounted display 100 by acquiring captured images and measured values from various cameras, motion sensors, and the like included in the head-mounted display 100 connected to the image processing device 200. Information regarding the position and orientation of the head-mounted display 100 can be used in the image processing section 244 to correct the field of view of the display image.

The image data acquiring section 240 includes the input/output interface 202, the partial image storage section 204, and the control section 206 in FIG. 3 and acquires compressed and encoded partial image data from the server 400 together with the generation time thereof. The image data acquiring section 240 also acquires a request signal for data discard of the provisional frame from the server 400. The decoding/decompressing section 242 includes the video decoder 208, the partial image storage section 210, the control section 206, and the control section 212 in FIG. 3, and decodes and decompresses the compressed and encoded partial image data. Here, the decoding/decompressing section 242 may start the decoding/decompression processing when the image data acquiring section 240 acquires data in the minimum unit area required for compression coding such as motion compensation or coding.

The decoding/decompressing section 242 also notifies the image processing section 244 and the display control section 246 of the request for discarding the data of the provisional frame transmitted from the server 400, thereby appropriately stopping the processing and display of the target frame. The image processing section 244 includes the image processing section 214, the partial image storage section 216, the control section 212, and the control section 218 in FIG. 3 and performs predetermined processing on the partial image data to generate partial image data for display. Note that the decoding/decompressing section 242 and the image processing section 244 have a common function of performing predetermined processing on the partial image data to generate the partial image data for display, and at least any one of these sections can also collectively be referred to as an "image processing section."

For example, as described above, in consideration of the distortion of the eyepiece provided in the head-mounted display 100, the image processing section 244 makes a correction to give the opposite distortion. Alternatively, the image processing section 244 synthesizes an image to be displayed together with a moving image, such as a UI plane image, in units of partial images. Alternatively, the image processing section 244 acquires the position and orientation of the user's head at that time and corrects the image generated by the server 400, in such a manner that the image correctly matches with the field of view at the time of display. This can minimize the time lag generated between the movement of the user's head and the display image due to the transfer time from the server 400.

The image processing section 244 may also perform any one of types of commonly performed image processing or a combination thereof. For example, the image processing section 244 may perform gamma curve correction, tone curve correction, contrast enhancement, and the like. That is, necessary offset correction may be performed on the pixel value/luminance value of the decoded and decompressed image data on the basis of the characteristics of the display device or the user's specification. Further, the image processing section 244 may refer to neighboring pixels and perform noise removal processing including such processing as superimposition, weighted averaging, and smoothing.

Further, the image processing section 244 may match the resolution of the image data with the resolution of the display panel, refer to neighboring pixels for bilinear/trilinear interpolations, and perform weighted averaging/oversampling. Further, the image processing section 244 may refer to neighboring pixels, determine the type of image texture, and selectively execute processing of denoise, edge enhancement, smoothing, tone/gamma/contrast correction on the basis of the determined type. At this time, the image processing section 244 may process the image together with the upscaler/downscaler of the image size.

Further, the image processing section 244 may perform format conversion in the case where the pixel format of the image data and the pixel format of the display panel are different from each other. For example, conversion from YUV to RGB and from RGB to YUV, conversion between 444, 422, and 420 in YUV, conversion between 8, 10 and 12-bit colors in RGB, and the like may be performed. Further, in the case where the decoded image data is in a format based on an HDR (High Dynamic Range) luminance range but a range of the display corresponding to the HDR luminance range is narrow (the displayable luminance dynamic range is narrower than the HDR format prescription, for example), the image processing section 244 may perform pseudo-HDR processing (color space change) to convert the image into an HDR luminance range format that can be handled by the display panel while retaining the features of the HDR image as much as possible.

In addition, in the case where the decoded image data is in a format based on the HDR but the display supports only SDR (Standard Dynamic Range), the image processing section 244 may perform a color space conversion into an SDR format while retaining the features of the HDR image as much as possible. In the case where the decoded image data is in a format based on the SDR but the display supports HDR, the image processing section 244 may perform enhancement conversion to the HDR format according to the characteristics of the HDR panel as much as possible.

Further, in the case where the gradation expression ability of the display is low, the image processing section 244 may perform addition of error diffusion or dithering processing that is performed together with pixel format conversion. Further, in the case where there is a partial loss or abnormality in the decoded image data due to the lack of network transfer data or transformed bits, the image processing section 244 may correct the corresponding region of the data. Further, the image processing section 244 may perform correction by using pixels that are estimated from the periphery of the past frame or the current frame through correction by single color filling or neighboring pixel duplication, correction by a neighboring pixel in the previous frame, and adaptive defect correction.

Further, the image processing section 244 may perform image compression in order to reduce the required band for the interface for output from the image processing device 200 to the display device. At this time, the image processing section 244 may perform lightweight entropy coding, index value reference coding, Huffman coding, and the like, by reference to neighboring pixels. Further, in the case where a liquid crystal panel is used as the display device, the resolution can be increased, but the reaction speed is slow. In the case where an organic EL (electroluminescent) panel is used as the display device, the reaction speed is high, but it is difficult to increase the resolution. In addition, a phenomenon called black smearing in which a color blur occurs in and around a black region may occur.

Therefore, the image processing section 244 may make corrections to eliminate various adverse effects of such a display panel. For example, in the case of a liquid crystal panel, the image processing section 244 resets the liquid crystal by inserting a black image between frames, to improve the reaction speed. Further, in the case of the organic EL panel, the image processing section 244 offsets a luminance value and a gamma value in the gamma correction to make the color blur due to black smearing less noticeable.

The image processing section 244 may perform super resolution processing on an image to increase the definition and restore or reconstruct a high frequency component. At this time, the image processing section 244 may perform conversion on the image by inputting image data into a database or network model which is constructed in advance by using machine learning or deep learning. Here, the image processing section 244 may reduce the delay by performing conversion in units of partial images. By causing the partial image unit at this time to agree with the partial image unit determined on the basis of the scanning order and the division configuration of the display panel, a series of processes can be pipelined, and further reduction in delay can be realized.

The display control section 246 includes the display controller 220 and the control section 218 in FIG. 3 and causes the display panel of the head-mounted display 100 or the flat plate display 302 to sequentially display partial image data for display. However, in the present embodiment, since pieces of the compressed and encoded partial image data are individually acquired from the server 400, it is conceivable that the acquisition order may be changed depending on the communication status, or the partial image data itself may not be acquired due to packet loss.

Therefore, the display control section 246 derives the elapsed time from the drawing of the partial image on the basis of the generation time of each partial image, and adjusts the outputs timing of the partial image to the display panel to reproduce the drawing timing in the server 400. To be specific, the display control section 246 identifies the data acquisition status such as the original display order, display timing, and missing amount of the partial image data on the basis of the generation time of the partial image data and/or the elapsed time from the generation time.

Then, the display control section 246 changes the target to be output to the display panel and appropriately adjusts the output order and the output timing according to the data acquisition status. For example, the display control section 246 determines whether to output the data of the original partial image included in the next frame or to output the data of the partial image included in the previous frame again, according to the data acquisition status. The display control section 246 determines such an output target as described above by the timing of the vertical synchronization signal at which the display of the next frame is started.

The display control section 246 may change the output target according to the amount (ratio) of the acquired partial image. For example, the display control section 246 may replace the output target with the data of the previous frame in the case where the partial image is missing at a ratio of a predetermined value or more in the frame. Further, the display control section 246 may change the target to be output during a period of time in which the next frame is displayed, according to the past output record of the frame and the elapsed time from the generation time. Then, the display control section 246 outputs the data of the partial image determined as the output target to the display panel in the determined order and timing.

The client information transmitting section 250 includes the input/output interface 202 in FIG. 3 and transmits the details of the user operation acquired by the input information acquiring section 248, to the server 400. At this time, the client information transmitting section 250 associates temporal information for identifying the contents displayed at the time when the user operation is made, with the details of the user operation, and transmits them to the server 400. Here, the "temporal information" is only required to be any parameter that represents information regarding the time axis, such as time (absolute time), difference time, and a frame number.

The client information transmitting section 250 may also transmit, to the server 400, the details of the correction applied to the display image by the image processing section 244. Further, the client information transmitting section 250 collects, from the image processing section 244 and the like, the result of the data discard request of the provisional frame transmitted from the server 400, and transmits the result to the server 400. At this time, the client information transmitting section 250 transmits the result with a higher priority than the others, so that the server 400 can detect the result at high speed. That is, the result of the data discard request of the provisional frame may be given high priority and transmitted ahead of other notifications and transfers that are in progress in parallel in the client information transmitting section 250, the input/output interfaces 416 and 202, the network, and the client information acquiring section 428, for example, which are the functions related to data transmission/reception between the server 400 and the image processing device 200.

Figure 7:
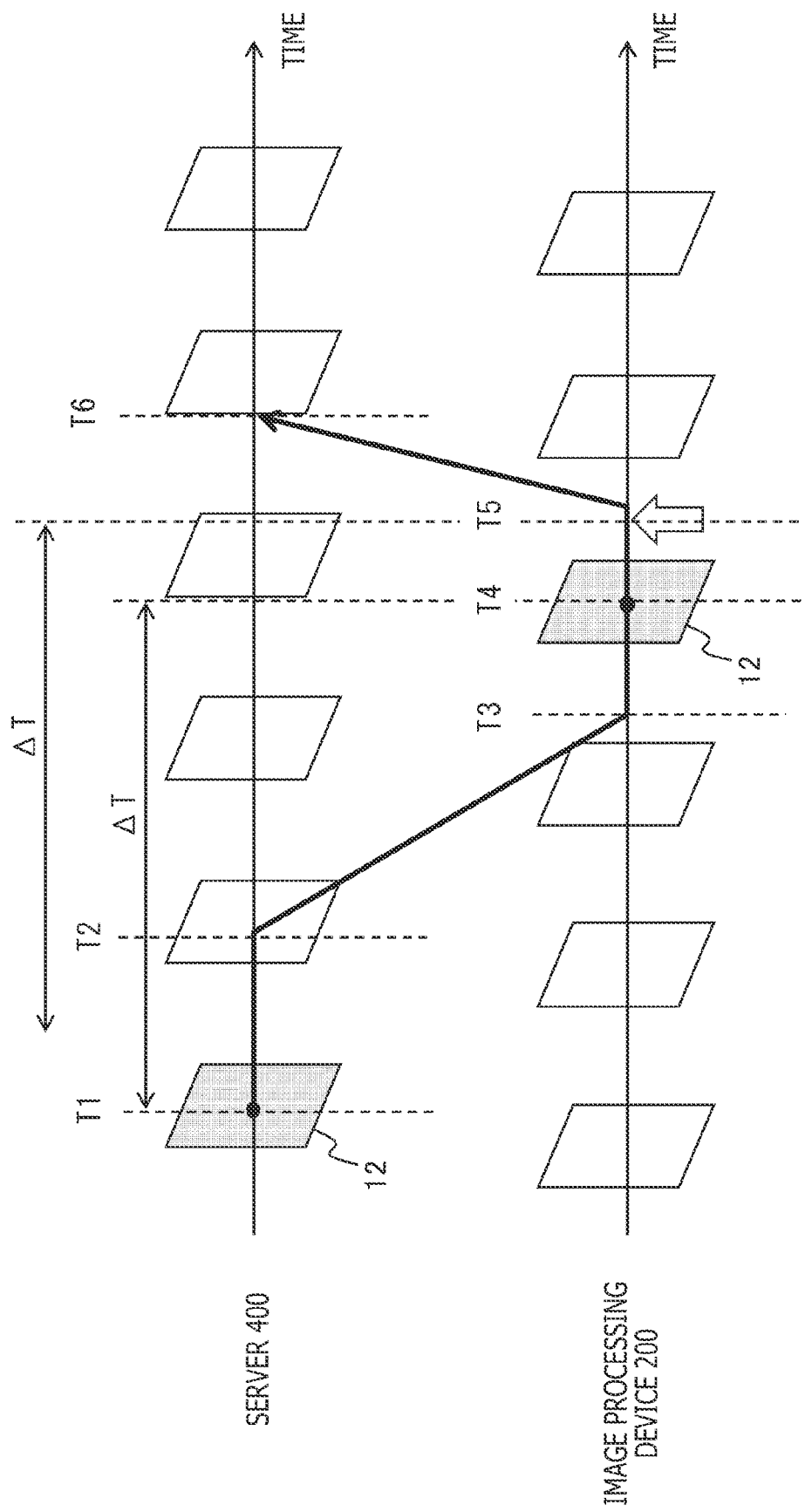
FIG. 7 is a diagram for illustrating a method in which an operation status identifying section of the server identifies a user operation performed on an image processing device and contents displayed at that time in the present embodiment.

FIG. 7 is a diagram for illustrating a method in which the operation status identifying section 432 of the server 400 identifies a user operation performed on the image processing device 200 and the contents displayed at that time. The upper part of the figure indicates the time axis of processing in the server 400, and the generation time of each frame is represented by a quadrilateral of the frame. The lower part indicates the time axis of processing in the image processing device 200, and the display time on the display device is represented by a quadrilateral of the frame.

For example, a frame 12 generated at time T1 in the server 400 is compressed and coded and is packetized as described above, and then, transmission of the resultant data to the image processing device 200 is started at time T2. Reception of the data is started at time T3 in the image processing device 200, and after decoding/decompression and image processing are performed on the data, the resultant data is output to and displayed on the display device at time T4. If a user who sees this performs some operation at time T5, then the information of the operation is received by the server 400 at time T6. In such a processing flow, the server 400 identifies the contents displayed when the user operation, which is acquired by the server 400 at time T6, is executed in the image processing device 200.

For example, as described above, the server 400 transmits the generation time of each frame to the image processing device 200 together with the image data. Therefore, the client information transmitting section 250 of the image processing device 200 associates the details of the user operation with the generation time T1 of the frame 12 displayed when the user operation is performed, and transmit them to the server 400. With this, the operation status identifying section 432 of the server 400 can identify the details of the transmitted user operation and the frame 12 which represents the contents displayed when the user operation is performed.

Alternatively, the time difference (for example, time difference $\Delta T$) between the time when the frame is generated in the server 400 (for example, time T1) and the time when the same frame is displayed in the image processing device 200 (for example, time T4) may be monitored by a handshake between the server 400 and the image processing device 200. In this case, the client information transmitting section 250 of the image processing device 200 transmits the time T5 at which the user operation is made to the server 400 together with the details of the user operation. Then, the operation status identifying section 432 of the server 400 can identify the frame 12 generated immediately before the time earlier by the time lag $\Delta T$ than the time T5 at which the user operation is made, as the contents displayed when the user operation is made. The operation status identifying section 432 may also identify the timing at which the user operation is performed on the image world during the frame display period.

Alternatively, the server 400 may transmit the image data and the frame number thereof to the image processing device 200, and the client information transmitting section 250 of the image processing device 200 may associate the details of the user operation, the number of the frame 12 displayed at the time when the user operation is performed, and the time T4 (absolute time) at which the user operation is performed, and transmit them to the server 400. Instead of the time T4 at which the user operation is performed, the difference time from the start of displaying the moving image to the time when the user operation is performed may be transmitted. Alternatively, the client information transmitting section 250 only transmits the number of the frame 12 together with the details of the user operation, and does not have to identify the detailed time when the user operation is performed during a period of time in which the frame is displayed.

In these cases, the operation status identifying section 432 of the server 400 identifies how many preceding frames are present after the user operation is performed on the image world, on the basis of the difference between the number of the transmitted frame 12 and the number of the latest frame. In order to realize this, in the instance storage section 430, the numbers of the frames generated so far are associated with the instances at these time points. In the case where the time T4 (absolute time) at which the user operation is performed or the difference time from the start of displaying the moving image to the time when the user operation is performed is further acquired, the operation status identifying section 432 also identifies the timing at which the user operation is performed on the image world during the frame display period. In this case, the generation time of each frame may be further associated in the instance storage section 430.

Figure 8:
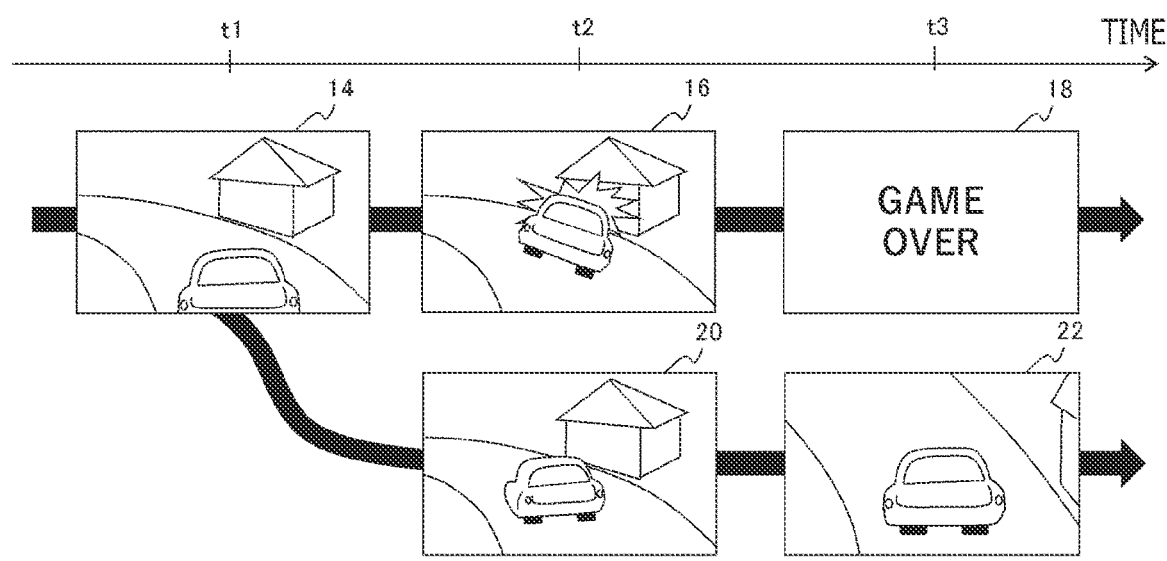
FIG. 8 is a diagram illustrating a case where a discard processing section of the server determines that a provisional frame should be discarded in the present embodiment.

FIG. 8 illustrates a case where the discard processing section 436 of the server 400 determines that the provisional frame should be discarded. The horizontal direction of the figure is the time axis direction, and the contents represented by the moving image are schematically illustrated in five frames. Here, assumed is a game in which a car object travels in a virtual world according to a user operation. First, in a frame 14 at time t1, the car object in the foreground is approaching a curve. Here, even though the user turns the steering wheel to the left, if the server 400 does not detect it, a state of collision with an obstacle is drawn at time t2 as illustrated in a frame 16.

Then, at time t3, as illustrated in a frame 18, "GAME OVER" may be displayed, that is, the game may end. As described above, the server 400 of the present embodiment retroactively reflects the input operation in the image world. That is, if it is detected before the time t3 that the steering wheel operation has been properly performed for the frame at the time t1, the server 400 derives, by calculation, the world in which the car goes around the curve without causing a collision or the like at the time t2.

In the figure, for the sake of understandability, such a state as described above is illustrated as a frame 20. Note that, in the case where the image processing device 200 corrects the field of view immediately before the image is displayed on the head-mounted display 100, the operation status identifying section 432 associates the corrected visual field with the input operation as described above. With this, the user operation can precisely be reflected in the image world.

As a result, the server 400 can generate a frame 22 having the contents in which the traveling is continued safely, at the time t3. Incidentally, at a stage where the server 400 detects a user operation, the frame 16 that has been generated or is being generated is a "provisional frame." In this example, since the provisional frame 16 represents a state in which the car has collided, the frame 16 contradicts the new frame 22 at time t3 representing the state in which the car is traveling.

For example, in the case where the server 400 detects a user operation after the time t3, a state in which the car is traveling is displayed after the frame 18 representing "GAME OVER," which is further unnatural. On the other hand, if the provisional frame 16 at time t2 has contents in which the car is slightly off the road, a large sense of discomfort is unlikely to be felt even if the frame 22 is displayed after that. Therefore, the discard processing section 436 compares, on the image or in the image world, the provisional frame 16 with the new frame 22 in the world in which the user operation has been reflected, and if the difference therebetween is larger than the set condition, the discard processing section 436 determines that the provisional frame 16 should be discarded.

Note that this comparison may be performed not only on the provisional frame immediately before the newly generated frame 22, but also sequentially on subsequent provisional frames which are to be displayed after the frame displayed when the user operation is performed. Then, the provisional frame which has a large difference from the setting condition may be the preferential target to be discarded. Further, as described above, in the case where the image processing device 200 does not stop the display in time even if the discard is decided, the continuity of the image is maintained assuming that the user operation has not been performed. That is, in the illustrated example, if the frame 16 has been displayed, the frame 18 is generated without any change and is then displayed after the frame 16.

Figure 9:
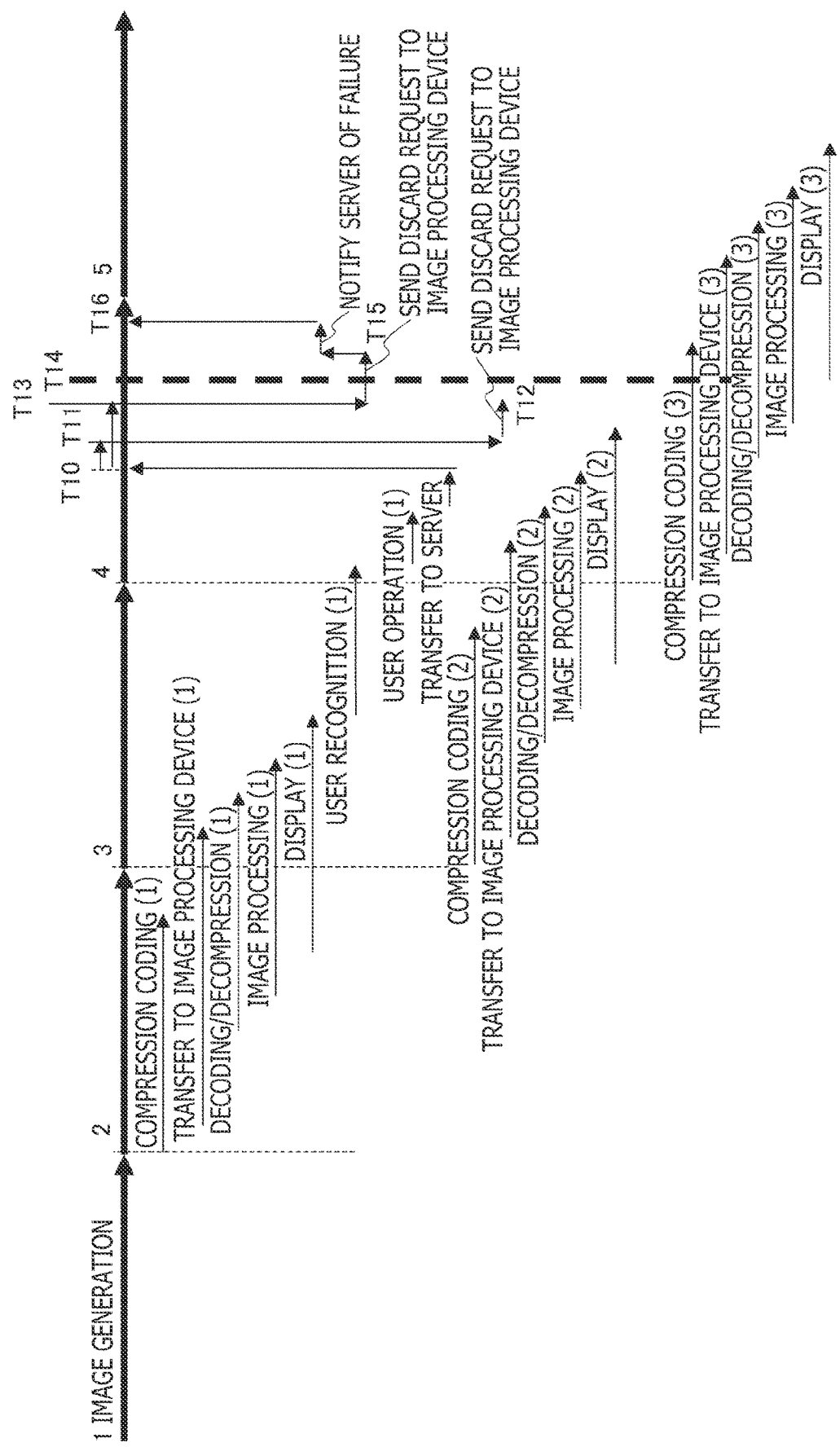
FIG. 9 is a diagram for illustrating a procedure for performing processing related to data discard of a provisional frame in the present embodiment.

FIG. 9 is a diagram for illustrating a procedure for performing processing related to data discard of the provisional frame. The representation of FIG. 9 is similar to that of FIG. 5, but the processing for the subsequent "2nd" and "3rd" frames is also illustrated in FIG. 9. The number in parentheses at the end of each processing name is the number of the frame to be processed. First, the "1st" frame is processed in a similar manner to in FIG. 5. Then, it is assumed that the information regarding the operation performed by the user who has seen the frame is received by the server 400 at the time T10.

As described above, when the server 400 acquires the information regarding the user operation and then generates the "5th" frame reflecting the acquired information, the discard processing section 436 compares the "2nd" to "4th" provisional frames with the contents of the information and determines whether or not those frames should be discarded. In the case where the frame determined to be discarded includes a provisional frame that has been or is being transmitted to the image processing device 200, namely, the "3rd" frame in the example of the figure, the discard processing section 436 requests the image processing device 200 to discard the corresponding data.

If the request signal is received by the image processing device 200 before the display of the frame to be discarded, the image processing device 200 stops displaying the frame. In the illustrated example, the request signal is transmitted at time T11, and the image processing device 200 receives the request signal at time T12. Since the time T12 is before time T14 at which the display of the "3rd" frame to be discarded is started, the prevention of the display is successful. In this case, the server 400 also internally executes the discard processing. That is, the result of the processing related to the provisional frame including the "4th" frame is discarded, and the state of the image world is corrected by assuming that the user operation is performed at the timing of the "1st" frame. The server 400 then generates the "5th" frame in the corrected world.

If the image processing device 200 receives the request signal after the display of the frame to be discarded has been started, the display with the contents is continued. In the illustrated example, the request signal is transmitted at time T13, and the image processing device 200 receives the request signal at time T15. Since the time T15 is later than the time T14 at which the display of the "3rd" frame to be discarded is started, stopping the display is unsuccessful. In this case, the image processing device 200 notifies the server 400 of the unsuccess. When acquiring the notification at time T16, the server 400 cancels the discard processing. That is, the result of the processing related to the provisional frames including the "4th" frame is not discarded, and the state of the image world is not corrected. Then, the server 400 generates the "5th" frame by assuming that the user operation has not been performed.

Figure 10:
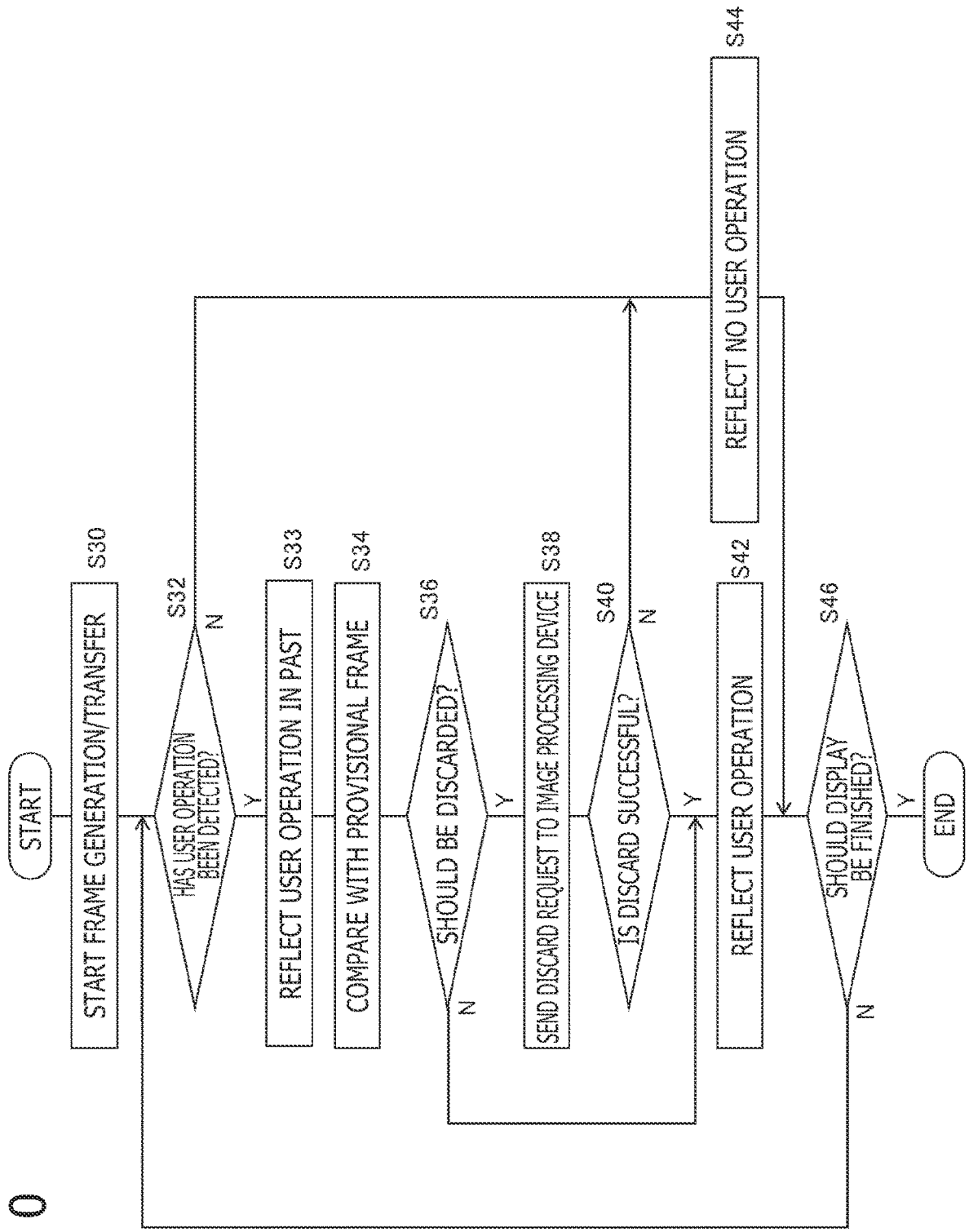
FIG. 10 is a flowchart illustrating a processing procedure in which the server generates a frame of a moving image while reflecting a user operation therein in the present embodiment.

FIG. 10 is a flowchart illustrating a processing procedure in which the server 400 generates a frame of a moving image while reflecting a user operation therein. First, the image generating section 420, the compression coding section 422, the packetizing section 424, and the communicating section 426 of the server 400 cooperate to start the generation and transfer processing of the frame of the moving image (S30). As a result, the frame data is transmitted to the image processing device 200 for each partial image and displayed.

During a period of time when the user operation is not detected in the image processing device 200 (N in S32), needless to say, the user operation is not reflected in the frame (S44), and the generation and transfer of the frame are continued (N in S46). When the user operation is detected (Y in S32), that is, when the client information acquiring section 428 receives the information related to the user operation from the image processing device 200, the operation status identifying section 432 identifies the frame that is displayed at the time when the user operation is performed in the image processing device 200 and the details of its correction.

As a result, the drawing section 434 tentatively generates a frame where the user operation is reflected in the instance at the corresponding time stored in the instance storage section 430, or generates an image world of the frame (S33). Then, the discard processing section 436 compares the tentative frame or the image world with the provisional frame or the world represented by the provisional frame (S34), and determines whether or not to discard the provisional frame in accordance with a predetermined determination criterion (S36).

If it should not be discarded (N in S36), the frame which is tentatively generated by the drawing section 434 and in which the user operation is reflected is transmitted to the image processing device 200 as it is (S42). In the case where it is determined that the frame should be discarded (Y in S36), a request signal is transmitted to the image processing device 200 to discard the transmitted provisional frame (S38). In the case where the request signal is received before the display of the corresponding frame is started and the data discard is successful (Y in S40), the server 400 transmits the frame which is generated by the drawing section 434 and in which the user operation is reflected to the image processing device 200 (S42).

At this time, the server 400 discards all the processing results of the provisional frames remaining in the device, and changes the instances stored in the instance storage section 430 into ones in which the user operation is reflected by correction. If the data discard is not successful (N in S40), the server 400 receives the notification regarding the unsuccess from the image processing device 200, and generates and transmits the subsequent frames assuming that the user operation has not been performed (S44). The processes from S32 to S44 are repeated, for example, until the user performs an operation to require the end of the display (N in S46), and when the end of the display is required, all the processes are terminated (Y in S46).

In the description so far, an example in which the processing related to the reflection of the user operation is executed frame by frame is illustrated, but in the case where the other processing is subjected to pipeline processing for each partial image, the processing related to the reflection of the user operation may also be executed in units of partial images. That is, the process of causing the contents represented by the frame to correspond to the user operation and the contents displayed at the time when the user operation is performed, and specifically, the processes of starting drawing of the image in which the user operation is reflected, comparing and discarding the provisional frame, etc., may be carried out all in units of partial images.

According to the present embodiment described above, in the system in which the image processing device 200, which is a client, receives and displays the image data generated by the server 400, the server 400 identifies the contents displayed at the time when the user operation is executed on the client side, and generates the next frame such that the corresponding world is depicted. As a result, the deterioration of responsiveness caused by the exchange of data between the server 400 and the image processing device 200 and the influence on the story of the image world can be minimized.

In addition, an effect on the continuity and consistency of the contents with the generated frame, which occurs because the user operation is reflected later, is checked, and whether or not to reflect the user operation in the frame is determined accordingly. For example, in the case where an irreversible scene has been displayed, the subsequent frames are generated assuming that there is no user operation. In the case where the display can be prevented, the data is discarded, and the frame in which the user operation is reflected is displayed. If the discontinuity with the provisional frame is small, while the provisional frame is displayed, the subsequent frames in which the user operation is reflected are also displayed. With the above measures, the user can enjoy the image world with equivalent responsiveness regardless of the data transmission path and without a sense of discomfort.

The present invention has been described above on the basis of the embodiment. The embodiment is exemplary, and it is understood by those skilled in the art that various modifications can be made on the combinations of the components or the processing processes of the embodiment and that such modifications are also within the scope of the present invention.

INDUSTRIAL APPLICABILITY

As described above, the present invention can be used for various information processing devices such as servers, image display devices, game devices, mobile terminals, and personal computers, and for image display systems including any of these devices, for example.

REFERENCE SIGNS LIST

1: Image display system
100: Head-mounted display
200: Image processing device
240: Image data acquiring section
242: Decoding/decompressing section
244: Image processing section
246: Display control section
248: Input information acquiring section
250: Client information transmitting section
302: Flat plate display
304: Input device
400: Server
420: Image generating section
422: Compression coding section
424: Packetizing section
426: Communicating section
428: Client information acquiring section
430: Instance storage section
432: Operation status identifying section
434: Drawing section
436: Discard processing section

The invention claimed is:

1. An image data transfer device comprising:
a client information acquiring section that acquires information related to a user operation performed on a client terminal;
an image generating section that generates a frame of a moving image according to the user operation;
a communicating section that performs streaming transfer of data of the generated frame to the client terminal,
wherein the image generating section identifies contents displayed at a time when the user operation is performed, and causes contents represented by the frame to correspond to the user operation and the contents displayed at the time when the user operation is performed, and
wherein the image generating section compares contents of a provisional frame that is generated after the user operation is performed but before it is detected that the user operation has been performed, with contents of a new frame corresponding to the user operation, to determine whether or not to discard data of the provisional frame.

2. The image data transfer device according to claim 1, wherein the image generating section reflects the user operation in a world that is a display target at the time when the user operation is performed, and then generates the frame with contents indicating a subsequent change.

3. The image data transfer device according to claim 2, wherein the image generating section includes an instance storage section that holds information regarding a past state in the world as the display target, and reflects the user operation in the past state.

4. The image data transfer device according to claim 1, wherein
the client information acquiring section acquires, from the client terminal, temporal information for identifying a frame displayed at the time when the user operation is performed, together with details of the user operation, and
the image generating section identifies the contents displayed at the time when the user operation is performed, on a basis of the temporal information.

5. The image data transfer device according to claim 4, wherein
the communicating section transmits a generation time of the frame together with the data of the frame to the client terminal,
the client information acquiring section acquires the generation time of the frame displayed at the time when the user operation is performed, as the temporal information, and
the image generating section identifies the frame displayed at the time when the user operation is performed, on a basis of the generation time.

6. The image data transfer device according to claim 4, wherein
the client information acquiring section acquires, from the client terminal, the time when the user operation is performed, and also acquires a time lag between generation of data of the frame and display of the data on the client terminal, and
the image generating section identifies a frame generated immediately before a time that is earlier by the time lag than the time when the user operation is performed.

7. The image data transfer device according to claim 6, wherein the image generating section identifies a timing at which the user operation is performed on an image world during a frame display period.

8. The image data transfer device according to claim 4, wherein
the client information acquiring section acquires a number of the frame displayed at the time when the user operation is performed, as the temporal information, and
the image generating section identifies how many preceding frames are present after the user operation is performed on an image world, on a basis of a difference between the number of the acquired frame and a number of a latest frame.

9. The image data transfer device according to claim 8, wherein
the client information acquiring section further acquires the time when the user operation is performed or a difference time from a start of displaying the moving image until the time when the user operation is performed, and
the image generating section identifies a timing at which the user operation is performed on the image world during a frame display period.

10. The image data transfer device according to claim 1, wherein
the client information acquiring section acquires information related to visual field correction for the frame that has been performed in the client terminal,
the image generating section causes the contents represented by the frame to correspond to the user operation and contents that have been undergone the visual field correction and that are displayed at the time when the user operation is performed.

11. The image data transfer device according to claim 1, wherein when it is determined to discard the data of the provisional frame, the communicating section requests the client terminal to discard the data.

12. The image data transfer device according to claim 11, wherein the client information acquiring section acquires, from the client terminal, a notification regarding failure to prevent display of the frame to be discarded, and the image generating section generates a new frame in response to the notification by assuming that the user operation has not been performed.

13. The image data transfer device according to claim 11, wherein the communicating section transmits a signal for requesting discard of the data to the client terminal with a higher priority than data of the frame.

14. The image data transfer device according to claim 13, wherein the signal for requesting the discard of the data and the notification regarding failure to prevent the display of the frame to be discarded, the notification being transmitted from the client terminal, are transmitted ahead of another notification and transfer that are in progress in parallel by a function related to data transmission and reception between the image data transfer device and the client terminal.

15. The image data transfer device according to claim 1, wherein when determining not to discard the data of the provisional frame, the image generating section generates a new frame corresponding to the user operation, following the provisional frame.

16. The image data transfer device according to claim 1, wherein the image generating section performs processing of causing the contents represented by the frame to correspond to the user operation and the contents displayed at the time when the user operation is performed, for each partial image smaller than one frame.

17. An image generation method performed by an image data transfer device, the method comprising:

acquiring information related to a user operation performed on a client terminal;

generating a frame of a moving image according to the user operation;

performing streaming transfer of data of the generated frame to the client terminal, wherein the generating the frame includes identifying contents displayed at a time when the user operation is performed, and causing contents represented by the frame to correspond to the user operation and the contents displayed at the time when the user operation is performed, and the generating the frame includes comparing contents of a provisional frame that is generated after the user operation is performed but before it is detected that the user operation has been performed, with contents of a new frame corresponding to the user operation, to determine whether or not to discard data of the provisional frame.

18. A non-transitory, computer readable storage medium containing a computer program, which when executed by a computer, causes the computer to perform an image generation method by carrying out actions, comprising:

acquiring information related to a user operation performed on a client terminal;

generating a frame of a moving image according to the user operation;

performing streaming transfer of data of the generated frame to the client terminal, wherein the generating the frame includes identifying contents displayed at a time when the user operation is performed, and causing contents represented by the frame to correspond to the user operation and the contents displayed at the time when the user operation is performed, and the generating the frame includes comparing contents of a provisional frame that is generated after the user operation is performed but before it is detected that the user operation has been performed, with contents of a new frame corresponding to the user operation, to determine whether or not to discard data of the provisional frame.

* * * * *